(12) United States Patent
Yang et al.

(10) Patent No.: US 9,497,713 B2
(45) Date of Patent: Nov. 15, 2016

(54) ACCURATE UPLINK POWER CONTROL FOR COMP AND C-RAN

(75) Inventors: Rongzhen Yang, Shanghai (CN); Jin Fu, Shanghai (CN);
(Continued)

(73) Assignee: Intel Corporation, Santa Clara, CA (US)

( * ) Notice: Subject to any disclaimer, the term of this patent is extended or adjusted under 35 U.S.C. 154(b) by 290 days.

(21) Appl. No.: 13/993,833

(22) PCT Filed: Dec. 29, 2011

(86) PCT No.: PCT/US2011/067936
§ 371 (c)(1),
(2), (4) Date: Oct. 11, 2013

(87) PCT Pub. No.: WO2013/006200
PCT Pub. Date: Jan. 10, 2013

(65) Prior Publication Data
US 2015/0304960 A1    Oct. 22, 2015

Related U.S. Application Data

(60) Provisional application No. 61/504,054, filed on Jul. 1, 2011.

(51) Int. Cl.
*H04W 52/00* (2009.01)
*H04W 52/24* (2009.01)
(Continued)

(52) U.S. Cl.
CPC ......... *H04W 52/242* (2013.01); *H04B 7/0697* (2013.01); *H04B 15/00* (2013.01);
(Continued)

(58) Field of Classification Search
None
See application file for complete search history.

(56) References Cited

U.S. PATENT DOCUMENTS

2005/0003846 A1* 1/2005 Anderson ........... H04W 52/225
455/522
2009/0097426 A1 4/2009 Yin
(Continued)

FOREIGN PATENT DOCUMENTS

CN    103931244 A    7/2014
EP    2306769 A1    4/2011
(Continued)

OTHER PUBLICATIONS

"International Application Serial No. PCT/US2011/067936, International Preliminary Report on Patentability mailed Jan. 16, 2014", 6 pgs.
(Continued)

*Primary Examiner* — Dang Ton
*Assistant Examiner* — Ronald H Davis
(74) *Attorney, Agent, or Firm* — Schwegman Lundberg & Woessner, P.A.

(57) ABSTRACT

A user equipment (UE) is arranged to send an uplink power reference signal to an enhanced Node B (eNB) associated with multiple reception points (RPs), to receive identification of an RP set and a downlink reference signal power level, to determine a path loss estimate for each downlink reference signal received from RPs of the RP set, to determine an uplink power level that is a function of the path loss estimates determined for the downlink signals received from the RPs of the RP set, and to use the determined uplink power level during communication with the multiple RPs.

24 Claims, 6 Drawing Sheets

(75) Inventors: Huaning Niu, Milpitas, CA (US);
Hujun Yin, Saratoga, CA (US)

(51) Int. Cl.

| | | |
|---|---|---|
| H04W 72/12 | (2009.01) | |
| H04W 72/08 | (2009.01) | |
| H04W 88/06 | (2009.01) | |
| H04B 7/06 | (2006.01) | |
| H04L 1/06 | (2006.01) | |
| H04W 72/04 | (2009.01) | |
| H04B 15/00 | (2006.01) | |
| H04W 8/02 | (2009.01) | |
| H04W 24/00 | (2009.01) | |
| H04W 52/02 | (2009.01) | |
| H04L 5/00 | (2006.01) | |
| H04L 27/34 | (2006.01) | |
| H04L 5/14 | (2006.01) | |
| H04W 4/00 | (2009.01) | |
| H04W 72/02 | (2009.01) | |
| H04W 76/02 | (2009.01) | |
| H04W 52/14 | (2009.01) | |
| H04W 24/08 | (2009.01) | |
| H04L 27/36 | (2006.01) | |
| H04L 1/00 | (2006.01) | |
| H04W 52/32 | (2009.01) | |
| H04W 84/04 | (2009.01) | |

(52) U.S. Cl.
CPC ........... *H04L 1/0038* (2013.01); *H04L 1/0041* (2013.01); *H04L 1/0045* (2013.01); *H04L 1/06* (2013.01); *H04L 5/0037* (2013.01); *H04L 5/14* (2013.01); *H04L 27/34* (2013.01); *H04W 4/005* (2013.01); *H04W 8/02* (2013.01); *H04W 24/00* (2013.01); *H04W 24/08* (2013.01); *H04W 52/0209* (2013.01); *H04W 52/0212* (2013.01); *H04W 52/0251* (2013.01); *H04W 52/0258* (2013.01); *H04W 52/143* (2013.01); *H04W 52/244* (2013.01); *H04W 72/02* (2013.01); *H04W 72/04* (2013.01); *H04W 72/042* (2013.01); *H04W 72/082* (2013.01); *H04W 72/1215* (2013.01); *H04W 72/1278* (2013.01); *H04W 76/028* (2013.01); *H04W 88/06* (2013.01); *H04L 1/0025* (2013.01); *H04L 27/362* (2013.01); *H04W 52/325* (2013.01); *H04W 84/042* (2013.01); *Y02B 60/50* (2013.01)

(56) References Cited

U.S. PATENT DOCUMENTS

| | | |
|---|---|---|
| 2010/0056215 A1 | 3/2010 | Gorokhov et al. |
| 2011/0149760 A1 | 6/2011 | Shrivastava et al. |
| 2011/0150113 A1 | 6/2011 | Oyman et al. |
| 2011/0159913 A1 | 6/2011 | Yang et al. |
| 2011/0235602 A1 | 9/2011 | Ji et al. |
| 2011/0268028 A1 | 11/2011 | Stern-Berkowitz et al. |
| 2013/0153298 A1* | 6/2013 | Pietraski ................. H04L 5/001 175/45 |
| 2014/0141830 A1* | 5/2014 | Skov ...................... H04W 52/10 455/522 |

FOREIGN PATENT DOCUMENTS

| | | |
|---|---|---|
| WO | WO-2010085891 A1 | 8/2010 |
| WO | WO-2013006200 A1 | 1/2013 |

OTHER PUBLICATIONS

"International Application Serial No. PCT/US2011/067936, Search Report mailed Jun. 5, 2012", 3 pgs.

"International Application Serial No. PCT/US2011/067936, Written Opinion mailed Jun. 5, 2012", 4 pgs.

Jiang, Dajie, et al., "Uplink Coordinated Multi-Point Reception for LTE-Advanced Systems", 5th International Conference on Wireless Communications, Networking and Mobile Computing., (Sep. 2009), 1-4.

* cited by examiner

```
-- ASN1START

RP-Set-ConfigDedicated ::=      SEQUENCE {
...
    RPList    SEQUENCE (SIZE (0..maxRPNum))  OF  RPPowerReferenceInfo
...
}

RPPowerReferenceInfo ::=        SEQUENCE {
    cellIdentity                    BIT STRING (SIZE (28)),
    referenceSignalType             ReferenceSignalType
    referenceSignalPower            INTEGER (-60..50)
}

ReferenceSignalType::=   INTEGER (0..1)

--ASN1STOP
```

ACCURATE UPLINK POWER CONTROL FOR COMP AND C-RAN

This application is a U.S. National Stage Filing under 35 U.S.C. 371 from International Application No. PCT/US2011/067936, filed Dec. 29, 2011 and published in English as WO 2013/006200 on Jan. 10, 2013, which claims priority under 35 U.S.C. 119(e) to U.S. Provisional Application Ser. No. 61/504,054, filed on Jul. 1, 2011, all of which are incorporated herein by reference in their entireties.

BACKGROUND

CoMP (Coordinated Multiple Point Transmission and Reception) and C-RAN (Centralized, Cooperative, Cloud-Radio Access Network) are becoming increasingly important in wireless communication systems involving Long Term Evolution (LTE) and LTE Advanced. Both C-RAN and CoMP systems perform joint/shared processing of uplink signaling received from different remote heads (RRHs). Power management is an important aspect of user equipment (UE) operation. Power management of uplink transmission ordinarily involves obtaining a path loss estimation. In earlier LTE and LTE-Advanced systems, uplink power control typically measured path loss based upon home eNB downlink CRS (Cell Reference Signal). The measured path loss value usually is used to decide uplink transmission power of the physical uplink shared channel (PUSCH), the physical uplink control channel (PUCCH), and the sounding reference signal (SRS). Thus, the path loss measurement directly determines uplink channel performance. Unfortunately, determining uplink power control based upon the home eNB CRS produces sub-optimal results since multiple uplink reception points (RPs) (e.g., multiple RRHs) are employed by C-RAN and CoMP.

Therefore, there has been a need for a system and method for improved determination of uplink path loss to support uplink transmission in C-RAN and CoMP systems used in wireless communications.

BRIEF DESCRIPTION OF THE DRAWINGS

Features and advantages of the embodiments herein will be apparent from the detailed description which follows, taken in conjunction with the accompanying drawings, which together illustrate, by way of example, features of the embodiments; and, wherein.

DESCRIPTION OF THE EMBODIMENTS

The following description is presented to enable any person skilled in the art to create and use a system and method to estimate uplink path loss and determine uplink power during communication between a wireless mobile device and one or more base stations that are associated with a plurality of reception points and that is arranged for joint processing of signals received from the mobile device by multiple reception points. Various modifications to the embodiments will be readily apparent to those skilled in the art, and the generic principles defined herein may be applied to other embodiments and applications. In the following description, numerous details are set forth for the purpose of explanation. However, well-known structures and processes are shown in block diagram form in order not to obscure the description with unnecessary detail. In the following description, similar or substantially identical items shown in different drawings are labeled with identical reference numbers.

CoMP encompasses a range of different techniques that enable the dynamic coordination of transmission and reception of cellular communication across multiple geographically separated evolved or enhanced Node Bs (eNBs). CoMP is an enhancement that has been included in LTE-Advanced. An LTE wireless network may include a number of eNBs and other network entities. Each eNB may provide communication coverage for a particular geographic area. In the '3$^{rd}$ Generation Partnership Project' (3GPP), the term "cell" may refer to a coverage area of an eNB and/or an eNB subsystem serving this coverage area. By providing connections to several base stations at once, using CoMP, data can be passed through the least loaded base stations for better resource utilization. Using CoMP, joint or shared processing of communication signals received from the same UE by different base station transceivers receivers within a base station may apply signal combining techniques to utilize multi-path interference constructively rather than destructively, thereby reducing interference levels, for example. Moreover, CoMP may be employed to increase overall received power at a UE handset.

Figure 1:
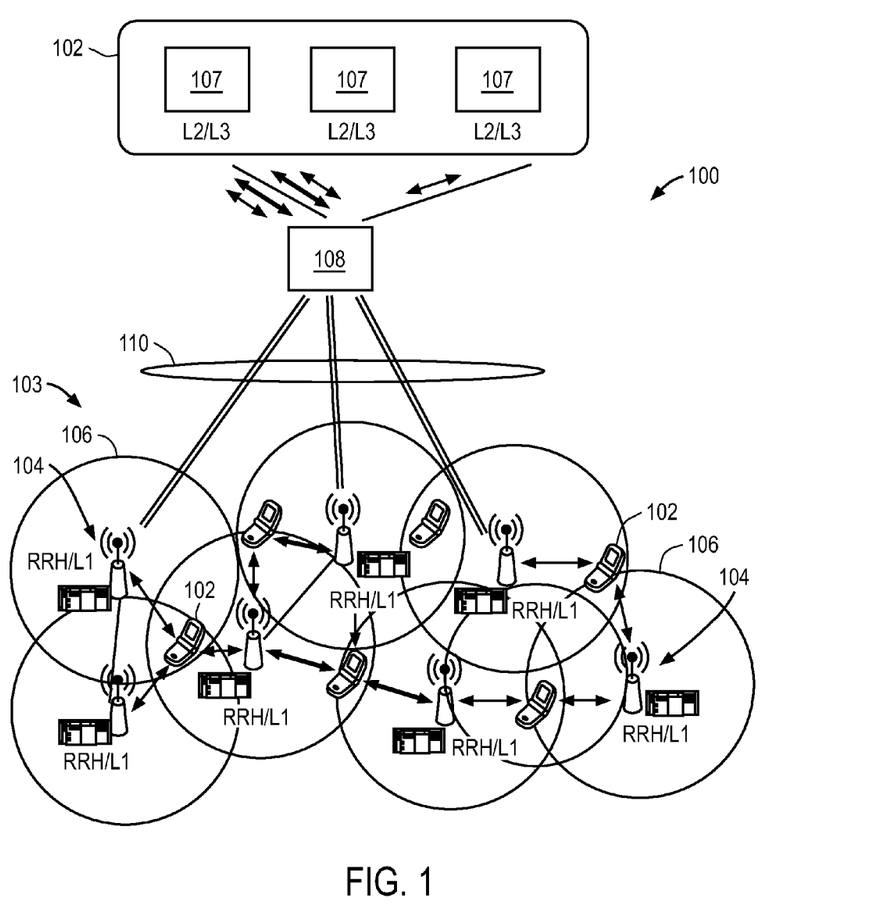
FIG. 1 is an illustrative drawing showing an example known C-RAN architecture in accordance with some embodiments.

C-RAN aims to reduce the load on cell sites by moving communication signal processing back into a common, shared "virtual" base station, referred to as the BBU pool (baseband unit pool). FIG. 1 is an illustrative drawing showing an example known C-RAN system architecture 100 in accordance with some embodiments. A C-RAN architecture typically comprises the distributed radio units referred to as remote radio heads (RRHs) 104 that include associated antennas, which are located at remote sites. Multiple RRHs 104 and associated antennas provide radio communication coverage within multiple overlapping cells 106 that collectively provide coverage over a wide coverage region 103. A centralized base station (the BBU pool) 102 106 includes processing systems/storage devices 107 configured for baseband and protocol stack processing of signals received by the remote RRHs at the multiple cell sites 106. A high bandwidth low-latency transport network 107, often including optical fiber links 110, connects the RRHs 104 and a BBU pool 102. The processing systems/storage devices 108 of the BBU 103 may include high performance programmable processors and real-time virtualization technology.

In contrast to some other prior distributed base station architectures, the C-RAN breaks up the static relationship between RRHs and base stations. A given RRH does not belong to any specific physical base station. Rather, radio signals from and into a particular RRH can be processed by a virtual base station, allocated from the processing capacity of the physical base station pool using real-time virtualization technology, for example. Generally speaking there are two different C-RAN architectures. In a 'full centralization' C-RAN architecture, baseband (i.e. layer 1) and the layer 2, layer 3 BTS functions all are implemented in the centralized processing system 102. In a 'partial centralization' architecture, the RRHs 104 integrate not only the radio function but also the baseband function, while other higher layer functions are implemented in the centralized processing system 102. For the partial centralization C-RAN architecture, although the centralized processing system 102 does not implement the baseband function, it is still referred to as the centralized processing system 102.

Figure 2:
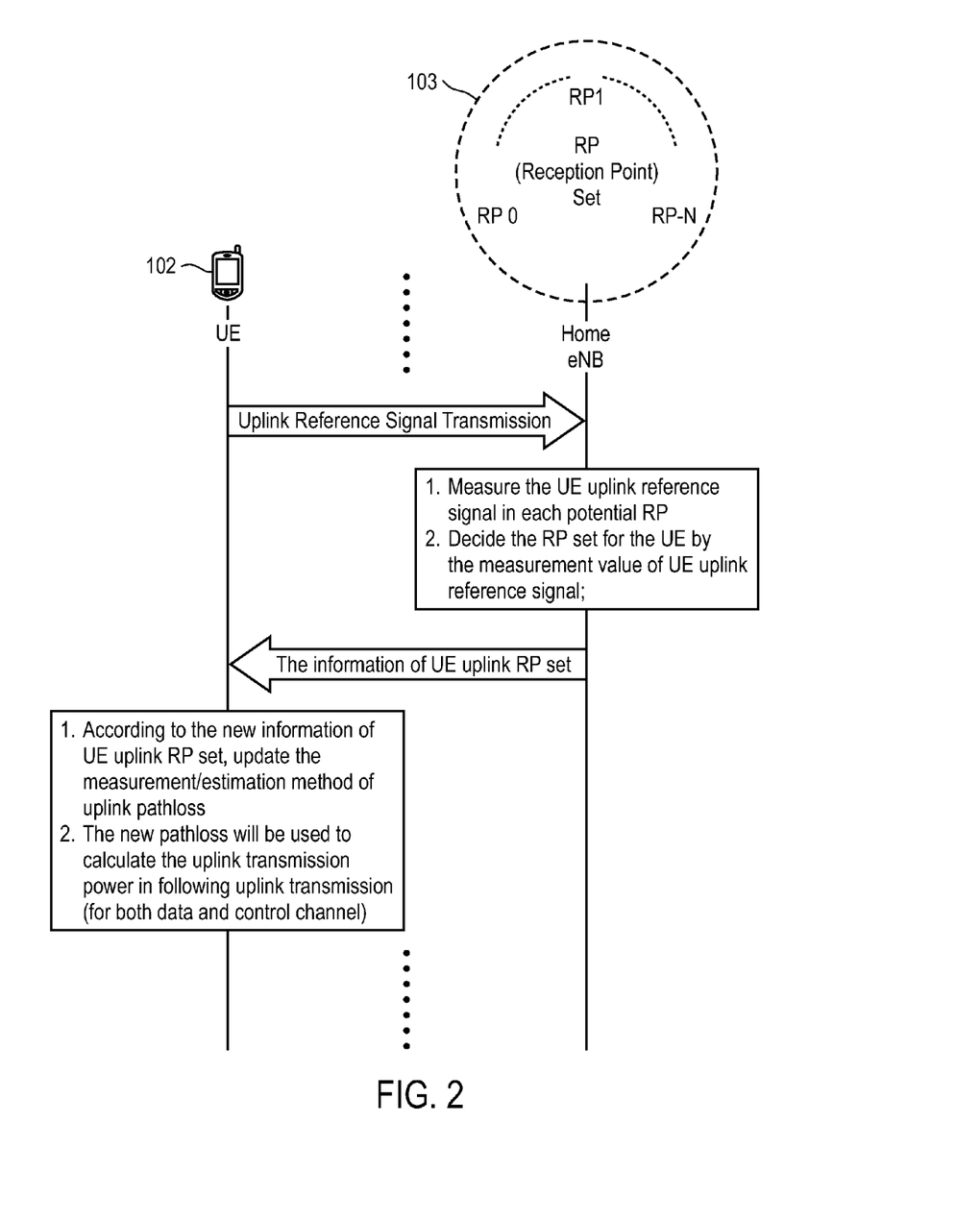
FIG. 2 is an illustrative drawing showing communication and processing by a mobile wireless device and a base station associated with multiple reception points during uplink path loss estimation and uplink power determination in accordance with some embodiments.

FIG. 2 is an illustrative drawing showing communication and processing by a wireless mobile wireless device and a base station associated with multiple reception points during uplink path loss estimation and uplink power determination in accordance with some embodiments. In some embodiments, the wireless mobile device 102 comprises UE and the base station 103 a home eNB that includes a plurality of reception points $RP_0$-$RP_X$. In this example, the base station 103 is shown as an eNB and is indicated by the collective coverage area of it associated RPs. The term 'home eNB' means the eNB that manages the UE. The term 'home' is used to distinguish 'neighbor eNBs', which are other eNBs with which the UE may communicate. The wireless mobile device (or UE) wirelessly transmits to the base station or home eNB an uplink power reference signal for use by the eNB in selecting a set of RPs to be used for shared processing of communication involving this UE (indicated by Cell IDs). To support the accurate path loss measurement by a UE in the case of multiple RPs, the UE receives information from the eNB indicating the RP set and the downlink transmission power of each RP's reference signal. In some embodiments involving LTE and LTE Advanced, for example, the UE uplink power reference signal can be any of the following signals defined in the indicated sections of the specification entitled, LTE Evolved Universal Terrestrial Radio Access (E-UTRA) Physical layer procedures (3GPP TS 36.213 version 8.8.0 Release 8) (hereinafter 3GPP TS 36.213): Uplink Sounding Reference Signal (section 8.2); Uplink Shared Channel (data channel) (section 8.1); or Uplink Control Channel (section 10). The UE stores indicia of the RP set and indicia of the downlink transmission power of each RP's reference signal in a computer readable storage device (not shown).

In some orthogonal frequency-division multiplexing (OFDM) embodiments, in which OFDM is used for messages involving voice and/or data communication, uplink power control involves determining the average power over a Single Carrier-Frequency Division Multiple Access (SC-FDMA) symbol in which a physical channel is transmitted. In some OFDM embodiments, the transmitted downlink signal consists of N subcarriers for a duration of N OFDM symbols. In an OFDM embodiment, a single subcarrier for one symbol period is referred to as a resource element. Downlink power control determines the energy per resource element (EPRE). It is noted that the term resource element energy also denotes the average energy taken over all constellation points for the modulation scheme applied.

The UE uplink power reference signal is received by multiple RPs within the home eNB. An indication of the received power of the UE uplink power reference signal at each RP is transmitted to a centralized processing system, which determines a set of RPs that are designated to communicate with the UE. In a LTE or LTE Advance system, the centralized processing system comprises a BBU. In a CoMP system, the centralized processing system comprises a group of BBUs. The home eNB responds to the UE uplink power reference signal by wirelessly transmitting to the UE information indicating a multi-RP set, the downlink reference signal type and downlink reference signal transmission power for each RP of the set. This information is sent back to the UE by a Transmission Point (TP) or TP Set defined in the scope of downlink CoMP, for example. The UE uses the received information to estimate path loss during communication involving the multi-RP set and to select an appropriate uplink transmission power, based upon the estimated path loss, to use in subsequent uplink transmission with the RP set for both data and control channels.

Figure 3:
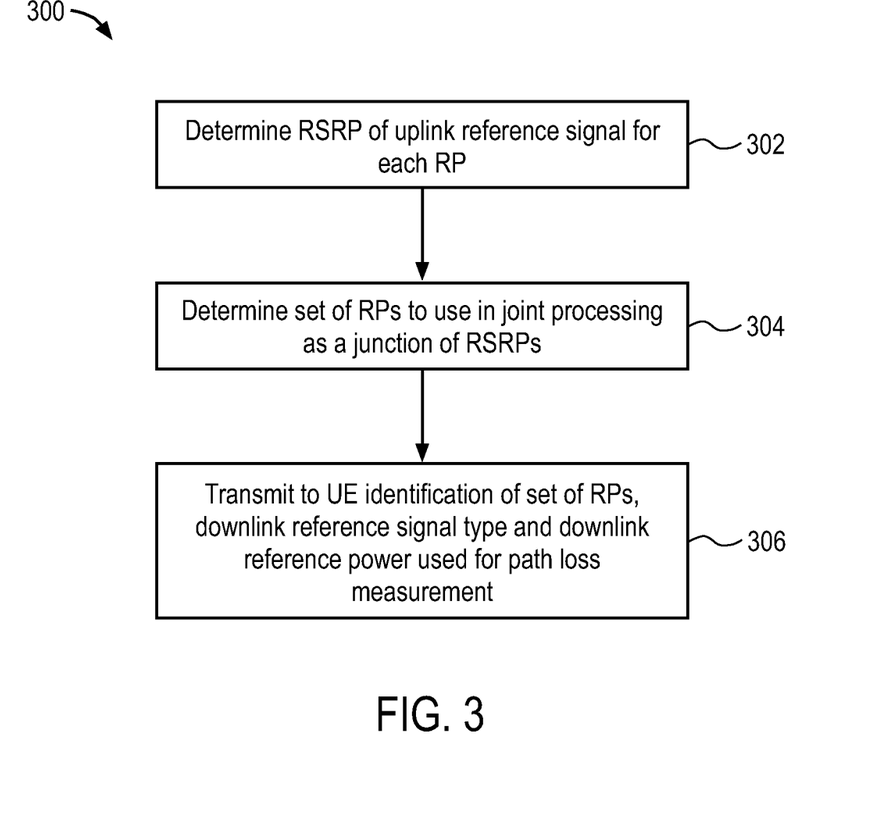
FIG. 3 is an illustrative flow diagram representing a process performed by a central processing system associated with a base station associated with multiple reception points accordance with some embodiments.

FIG. 3 is an illustrative flow diagram representing a process 300 performed by a central processing system associated with a base station associated with multiple reception points accordance with some embodiments. In a C-RAN environment, the central processing system 102 is implemented as a BBU. In a CoMP system, the central processing system (not shown) may be implemented also as a BBU. The central processing system is configured with computer program instruction code to implement the modules shown within FIG. 3. Module 302 measures the UE uplink power reference received signal received power (RSRP) for each reception point (RP) of the home eNB. The measurement involves the physical signal received in UE Rx antennas, then going through UE link level signal processing circuitry chain to demodulate the reference signal and measure RSRP. The measurement result for each RP can be represented as:

$$\text{RSRP\_UE}(i)\_\text{RP}(j), \qquad \text{E.1}$$

where, i is the index of UE j is the index of RP.

Module 304 determines as a function of the measured RSRP_UE(i)_RP(j) values, the RP set for a given UE to be involved in joint or shared processing of signals transmitted by UE(i). In some embodiments, the RP set for UE(i) is represented as:

$$\text{RP\_SET}(i) = \{\text{RP}(k)\}, k=1{\sim}N, \qquad \text{E.2}$$

where RP(k) represents the constituent RPs of the set of N RPs with the N largest magnitude measurements of received signal strength of the UE uplink power reference signal transmitted by UE(i).

Module 306 sends to UE(i) indicia of the constituents of RP_SET(i). In particular, in some embodiments, the following RP set information is transmitted to the UE(i) for each RP(k):

1. Identify of RP(k), such as the CellID, for example.
2. Identity of the Downlink reference signal type used for downlink path loss measurement; in LTE and LTE-Advanced with CoMP, the downlink reference signal type may be CRS, CSI-RS, as a function of the measured RSRP_UE(i)_RP(j) values, for example.
3. Downlink Reference Signal Transmission Power Level (for use by the UE for downlink path loss measurement).

Figure 4:
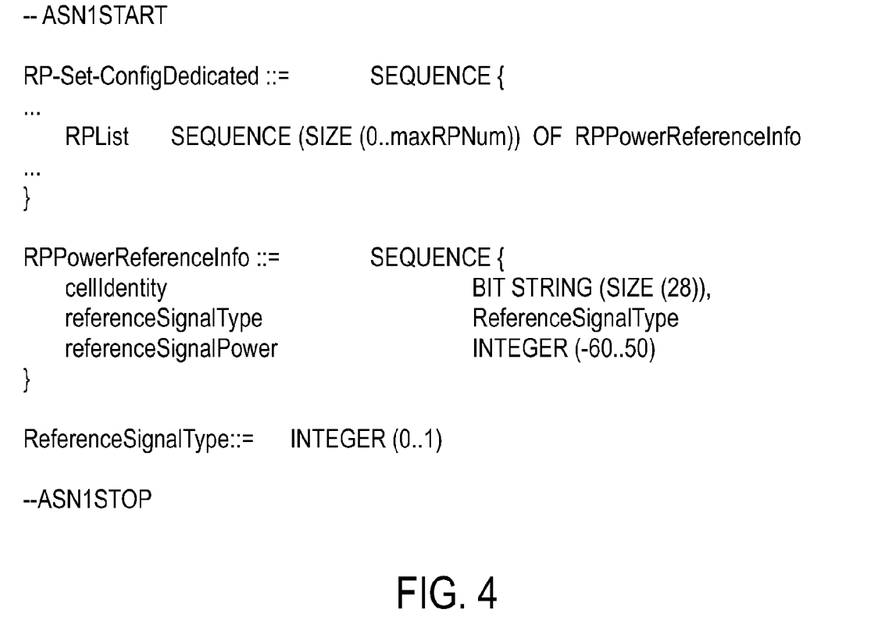
FIG. 4 shows illustrative code to create an information element for one RP of an RP set for LTE and LTE-Advanced System in accordance with some embodiments.

FIG. 4 shows illustrative ASN.1 code to create an information element for one RP of an RP set (named as RP-Set-ConfigDedicated) for LTE and LTE-Advanced System in accordance with some embodiments.

Figure 5:
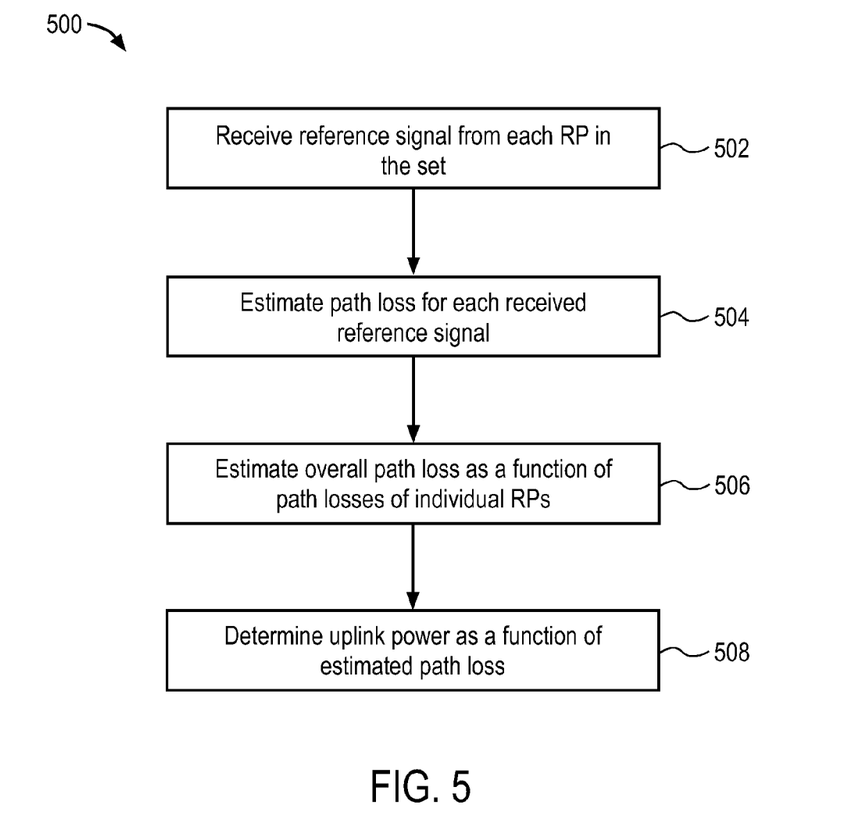
FIG. 5 is an illustrative flow diagram representing a process performed by the wireless mobile device in accordance with some embodiments.

FIG. 5 is an illustrative flow diagram representing a process 500 performed by the wireless mobile device in accordance with some embodiments. The UE is configured with computer program instruction code to implement the modules shown within FIG. 5. Module 502 receives the designated reference signal type from each RP in the set. In response to receipt of the RP set information, module 504 estimates path loss for each RP of the RP set. Specifically, based upon the indicated reference signal type, the UE measures the RSRP (Reference Signal Received Power) of the corresponding downlink reference signal, expressed as:

$$RSRP\_RP(k), \qquad \text{E.3}$$

where the k is the index of the RP

The physical signal received in UE Rx antennas, then go through UE link level signal processing circuitry chain to demodulate the reference signal and measure RSRP.

In some embodiments, the UE estimate of path loss involves determining a difference between the identified reference signal power level and the RSRP for each received reference signal. In some embodiments, RSRP measurements are low pass filtered to mitigate sudden or marked changes in measurement values. In some embodiments, path loss for RP(k) is determined as follows:

$$PL(k) = \text{reference SignalPower}(k) - \text{higher layer filtered} \\ RSRP\_RP(k) \qquad \text{E.4}$$

Where referenceSignalPower(k) is obtained from the RP set information. In some embodiments, the higher layer filtered operation of LTE is defined in section 5.5.3.2 entitled, "Layer 3 Filtering" of the specification entitled, 3GPP TS 36.331 V10.3.0 (2011-September); 3rd Generation Partnership Project; Technical Specification Group Radio Access Network; Evolved Universal Terrestrial Radio Access (E-UTRA); Radio Resource Control (RRC); Protocol specification (Release 10), for example.

The higher layer filter is defined in some embodiments as:

Higher_layer_filtered(RSRP_RP(k))=(1−alpha)
*Higher_layer_filtered(RSRP_RP(k))+
alpha*RSRP_RP(k)

Here, alpha is the value sent from eNB to UE by Layer 3 signals, RSRP_RP(k) is the current measured RSRP value of $k^{th}$ RP, and Higher_layer_filtered(RSRP_RP(k)) is initialized as first measured RSRP value of $k^{th}$ RP;

Module 506 estimates the overall uplink path loss for use in determining the uplink power level to use for transmissions to the RPs designated as members of the RP set. It will be appreciated that information received by those designated RPs is jointly processed by the central processing system 102 to utilize multi-path interference constructively rather than destructively, thereby reducing interference levels, for example. Module 506 determines the overall path loss as a function of individual path losses for individual RPs. In some embodiments, the overall path loss is determined according to the following expression:

$$PL = PL = \dfrac{1}{\sum\limits_{k=1}^{N} \dfrac{1}{PL(k)}} \qquad \text{E.5}$$

In some embodiments, if all referenceSignalPower(k) have the same value, the estimation of uplink power can be derived by another simplified expression:

$$PL = referenceSignalPower(k) - \text{high layer filtered} \sum_{k=1}^{N} RSRP\_RP(k) \qquad \text{E.6}$$

Module 508 determines uplink power level for use in data and control channels as a function of the overall estimated path loss as described above based upon the uplink power control expressions defined in section 5 of the specification 3GPP TS 36.213, for example, to decide all uplink channels' transmission power.

The UE and the RPs of the designated set within the eNB then proceed to communicate using the determined uplink power. It will be appreciated that the UE may continue to monitor RSRP of the downlink reference signal received from the RPs of the set and may update its overall path loss estimate and the uplink power accordingly.

Figure 6:
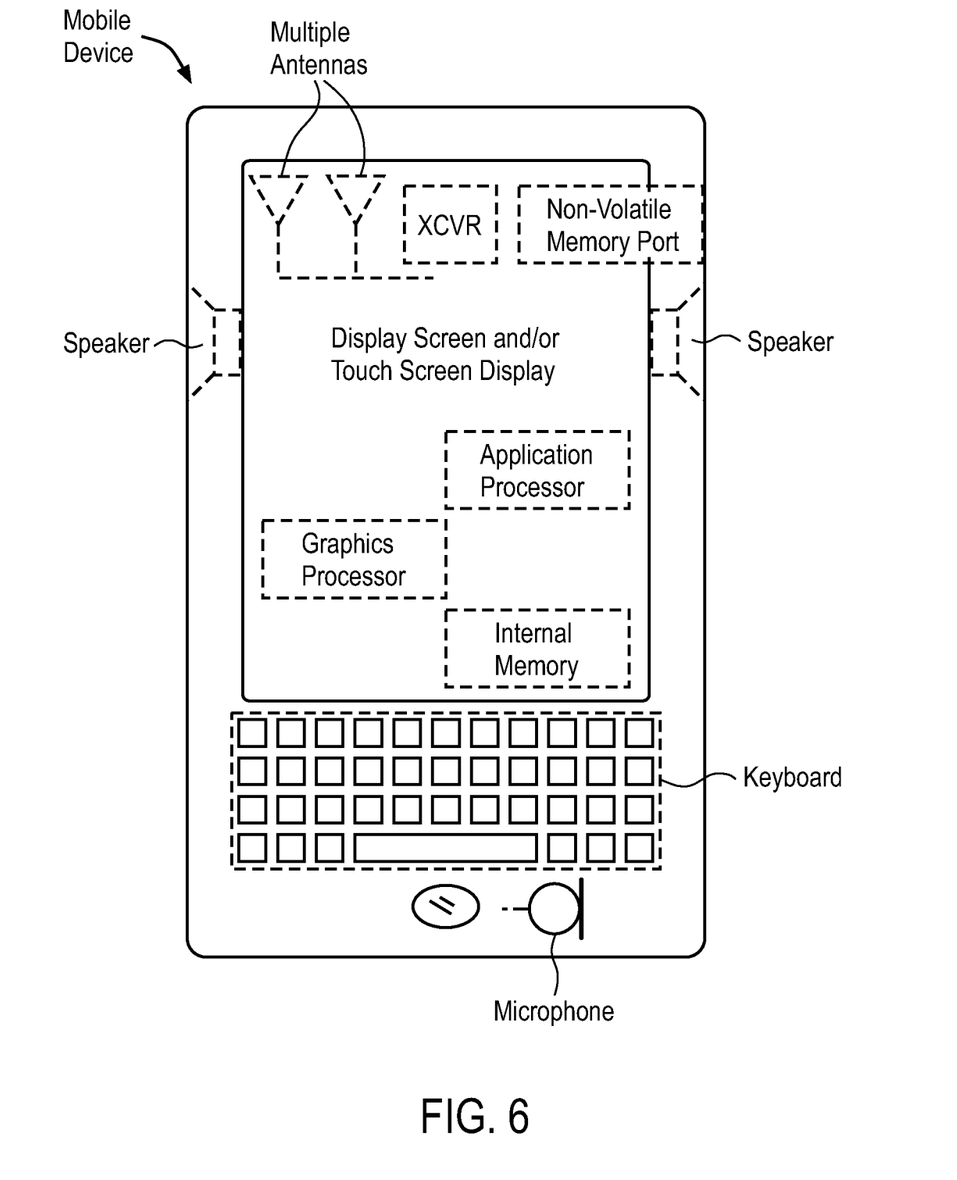
FIG. 6 provides an example illustration of a wireless mobile device, such as a user equipment (UE), a mobile communication device, a tablet, a handset, or other type of mobile wireless device.

FIG. 6 provides an example illustration of a wireless mobile device, such as a user equipment (UE), a mobile communication device, a tablet, a handset, or other type of mobile wireless device. The mobile device can include one or more antennas configured to communicate with a base station (BS), an evolved Node B (eNB), or other type of wireless wide area network (WWAN) access point. The mobile device can be configured to communicate using at least one wireless communication standard including 3GPP LTE, WiMAX, High Speed Packet Access (HSPA), Bluetooth, and WiFi. The mobile device includes transmitter and receiver (XCVR) that can communicate using separate antennas for each wireless communication standard or shared antennas for multiple wireless communication standards. The mobile device can communicate in a wireless local area network (WLAN), a wireless personal area network (WPAN), and/or a wireless wide area network (WWAN).

FIG. 6 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. The mobile device includes an application processor and a graphics processor coupled to an internal memory device to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Various techniques, or certain aspects or portions thereof, may take the form of program code (i.e., instructions) embodied in tangible media, such as floppy diskettes, CD-ROMs, hard drives, or any other non-transitory machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

The foregoing description and drawings of embodiments in accordance with the present invention are merely illustrative of the principles of the invention. Therefore, it will be understood that various modifications can be made to the embodiments by those skilled in the art without departing from the spirit and scope of the invention, which is defined in the appended claims.

What is claimed is:

1. A user equipment (UE) arranged to communicate with an enhanced Node B (eNB) that includes a set including multiple reception points (RPs), the UE comprising:
   a transceiver configured to,
      send an uplink power reference signal to the multiple reception points (RPs) of the set of RPs;
      receive from the eNB, identification of a subset of the set that includes multiple RPs, the subset including two or more RPs from the set of RPs, and identification of a downlink reference signal power level for each reference signal to be used by an RP of the identified subset;
      receive downlink reference signals from RPs of the identified subset; and
   a processor configured to,
      determine a path loss estimate for each received downlink reference signal received from an identified RP of the identified subset, based at least in part upon the downlink reference signal power level identified for the RP from which the reference signal is received; and
      determine an uplink power level that is a function of the path loss estimates determined for the downlink signals received from the RPs of the identified subset;
   wherein the transceiver and the processor are further configured to,
      use the determined uplink power level during communication with the identified RPs.

2. The UE of claim 1 wherein the processor is further arranged to,
   determine an overall path loss estimate as a function of the determined path loss estimates for each received downlink reference signal; and
   wherein the determined uplink power level is a function of the determined overall path loss estimate.

3. The UE of claim 1,
   wherein determining a path loss estimate for each received downlink reference signal includes determining a received signal received power (RSRP) for each such received downlink reference signal.

4. The UE of claim 1,
   wherein determining a path loss estimate for each received downlink reference signal includes:
      determining a received signal received power (RSRP) each such received downlink reference signal, and
      determining a difference between the identified downlink reference signal power level and each determined RSRP.

5. The UE of claim 1,
   wherein determining a path loss estimate for each received downlink reference signal includes:
      determining a received signal received power (RSRP) for each such received downlink reference signal,
      low pass filtering the determined RSRPs, and
      determining a difference between the identified downlink reference signal power level and each determined low pass filtered RSRP.

6. The UE of claim 1 wherein the transceiver is further arranged to, receive identification of a type of downlink reference signal used for downlink path loss measurement.

7. The UE of claim 1,
   wherein the downlink reference signal includes an eNB downlink cell reference signal.

8. The UE of claim 1 wherein the transceiver is further arranged to, transmit and receive messages using orthogonal frequency-division multiplexing during message communication with the RPs in accordance with a 3GPP Long Term Evolution (LTE) Advanced (LTE-A) standard.

9. The UE of claim 1 including further including:
one or more antennas arranged to communicate with the eNB;
a storage device encoded to store,
instruction code to cause the processor to use the transmitter to send an uplink power reference signal to the subset of multiple RPs;
indicia of the subset including two or RPs identified by the eNB;
indicia of the downlink reference signal power level for each reference signal identified by the eNB;
instruction code to cause the processor to determine a path loss estimate for each downlink reference signal received by the receiver circuitry from an RP of the identified subset, based at least in art upon the downlink reference signal power level identified for the RP from which the reference signal is received;
instruction code to cause the processor to determine an uplink power level that is a function of the path loss estimates determined for the downlink signals received from the RPs of the identified subset; and
instruction code to cause the processor to use the determined uplink power level during communication with the identified RPs.

10. The UE of claim 9,
wherein the instruction code to cause the processor to determine a path loss estimate each received downlink reference signal includes:
instruction code to cause the processor to determine a received signal received power (RSRP) for each such received downlink reference signal, and
instruction code to cause the processor to determine for each received downlink reference signal a difference between its identified downlink reference signal power level and its determined RSRP.

11. The UE of claim 10 further including:
instruction code to cause the processor to determine an overall path loss estimate as a function of the determined path loss estimates for each received downlink reference signal;
wherein the determined uplink power level is a function of the determined overall path loss estimate.

12. A method of communication between a user equipment (UE) and an enhanced node B (eNB) that includes a plurality reception points (RPs) arranged to implement joint processing of signals received by multiple reception points (RPs) associated with the eNB, the method comprising:
sending an uplink power reference by the UE to multiple RPs of the eNB;
receiving from the eNB by the UE from the eNB identification of a subset including two or more RPs associated with the eNh and identification of a downlink reference signal power level for each reference signal to be used by an RP of the identified subset;
receiving a downlink reference signal by the UE from each of the RPs of the identified subset; and
transmit to the identified RPs, by the UE, messages having an uplink power level that is a function of received signal received powers (RSRPs) of the identified downlink reference signals received by the UE.

13. The method of claim 12 further includes the UE,
determining a path loss estimate for each received downlink reference signal received from an identified RP, based at least in part upon the downlink reference signal power level identified for the RP from which the reference signal is received; and
determining an overall path loss estimate as a function of the determined path loss estimates for each received downlink reference signal;
wherein the uplink power level is a function of the determined overall path loss estimate.

14. The method of claim 12 further includes the UE,
determining a power loss as a function of the identified downlink reference signal power level for each received downlink reference signal; and
determining the uplink power level as a function of the determined power losses.

15. The method of claim 12 further includes the UE,
determining a received signal received power (RSRP) for each such received downlink reference signal;
low pass filtering the determined RSRPs;
determining for each received downlink reference signal a difference between its identified downlink reference signal power level and its determined low pass filtered RSRP; and
determining the uplink power level as a function of the determined differences.

16. The method of claim 12 further includes the UE,
transmit and receive messages using orthogonal frequency-division multiplexing during message communication with the RPs in accordance with a 3GPP Long Term Evolution (LTE) Advanced (LTE-A) standard.

17. An enhanced Node B (eNB) that includes a base station and a plurality reception points (RPs) arranged to implement joint processing of signals received by multiple reception points (RPs) associated with the eNB,
wherein the multiple RPs of the eNB are arranged to receive an uplink power reference signal transmitted by a user equipment (UE);
wherein the base station is arranged to determine a subset including two or more RPs as a function of the received signal received power (RSRP) of the uplink power reference signal received by the RPs and to determine a reference signal power level for each RP of the subset including two or ore RPs;
wherein the base station configures at least one RP to send to the UE identification of the subset including two or more RPs and identification of a downlink reference signal power level for each reference signal for each RP of the subset of RPs; and
wherein the base station configures each RP of the subset including two or more RPs to send a downlink reference signal to the UE.

18. The eNB of claim 17 further arranged to,
transmit and receive messages using orthogonal frequency-division multiplexing during message communication with the UE in accordance with a 3GPP Long Term Evolution (LTE) Advanced (LTE-A) standard.

19. The eNB of claim 17,
wherein the subset including two or more RPs includes the RPs having largest magnitude RSRPs of the uplink power reference signal.

20. A method of communication between a user equipment (UE) and an enhanced Node B (eNB) that includes a plurality reception points (RPs) arranged to implement joint processing of signals received by multiple reception points (RPs) associated with the eNB comprising:
receiving by a plurality of RPs within the access point an uplink power reference signal transmitted by the UE;

determining by the eNB a subset including two or more RPs as a function of the received signal received power (RSRP) of the uplink power reference signal received by the respective RPs and a reference signal power level for each RP of the subset including two or more RPs;

sending by the eNB to the UE identification of the subset including two or more RPs and identification of a downlink reference signal power level for each reference signal for each RP of the subset including two or more RPs; and sending by the RPs of the subset the downlink a reference signal to the UE.

21. The method of claim 20,
wherein determining the subset including two or more RPs as a function of the RSRP of the uplink power reference signal received by the respective RPs includes selecting RPs with the strongest RSRPs for membership in the subset including two or more RPs.

22. The method of claim 20 further including:
jointly processing by the access point signals received by RPs of the subset including two or more RPs from the UE,
transmitting to the identified RPs, by the UE, messages having an uplink power level that is a function of received signal received powers (RSRPs) of the identified downlink reference signals received by the UE.

23. The method of claim 20 further including:
sending by the eNB identification of a type of downlink reference signal used for downlink path loss measurement.

24. The method of claim 20 further including:
transmit and receive messages using orthogonal frequency-division multiplexing by the RPs during message communication with the UE in accordance with a 3GPP Long Term Evolution (LTE) Advanced (LTE-A) standard.

* * * * *